United States Patent [19]

Klaar

[11] 4,139,057
[45] Feb. 13, 1979

[54] METHOD AND DEVICE FOR MEASURING MOISTURE IN ELECTRIC MACHINES

[75] Inventor: Jürgen Klaar, Mülheim an der Ruhr, Fed. Rep. of Germany

[73] Assignee: Kraftwerk Union Aktiengesellschaft, Mülheim an der Ruhr, Fed. Rep. of Germany

[21] Appl. No.: 822,798

[22] Filed: Aug. 8, 1977

[30] Foreign Application Priority Data

Aug. 9, 1976 [DE] Fed. Rep. of Germany ....... 2635829

[51] Int. Cl.² ............................................... H02K 9/00
[52] U.S. Cl. .................................. 165/107 R; 310/64
[58] Field of Search ............... 165/105, 106, 107, 108; 310/64, 58

[56] References Cited

U.S. PATENT DOCUMENTS

| | | | |
|---|---|---|---|
| 2,887,593 | 5/1959 | Wiedemann | 310/58 |
| 2,893,701 | 7/1959 | Bell | 165/107 X |
| 2,970,232 | 1/1961 | Kilbourne | 310/64 X |
| 3,122,668 | 2/1964 | Cuny | 310/64 X |

Primary Examiner—Edgar W. Geoghegan
Attorney, Agent, or Firm—Herbert L. Lerner

[57] ABSTRACT

System for preventing moisture precipitation at sensitive machine parts and for measuring moisture to determine leaks within the housing of an electric machine in which the winding is cooled with water and in which a gas stream cooled by a heat exchanger is circulated within the housing. The gas circulating within the housing is passed in contact with a heat sink maintained at a temperature below any machine part within the housing. This precipitates moisture from the gas. The gas which is returned for cooling the machine parts has a low dew point which does not permit precipitation of moisture on the sensitive machine parts which are at a higher temperature. In addition recirculation of the cooled gas is continued until the moisture conditions in the circulating gas are stable or steady. Moisture conditions in the gas are then measured to determine fluctuations which indicate leakage of moisture into the housing.

7 Claims, 1 Drawing Figure

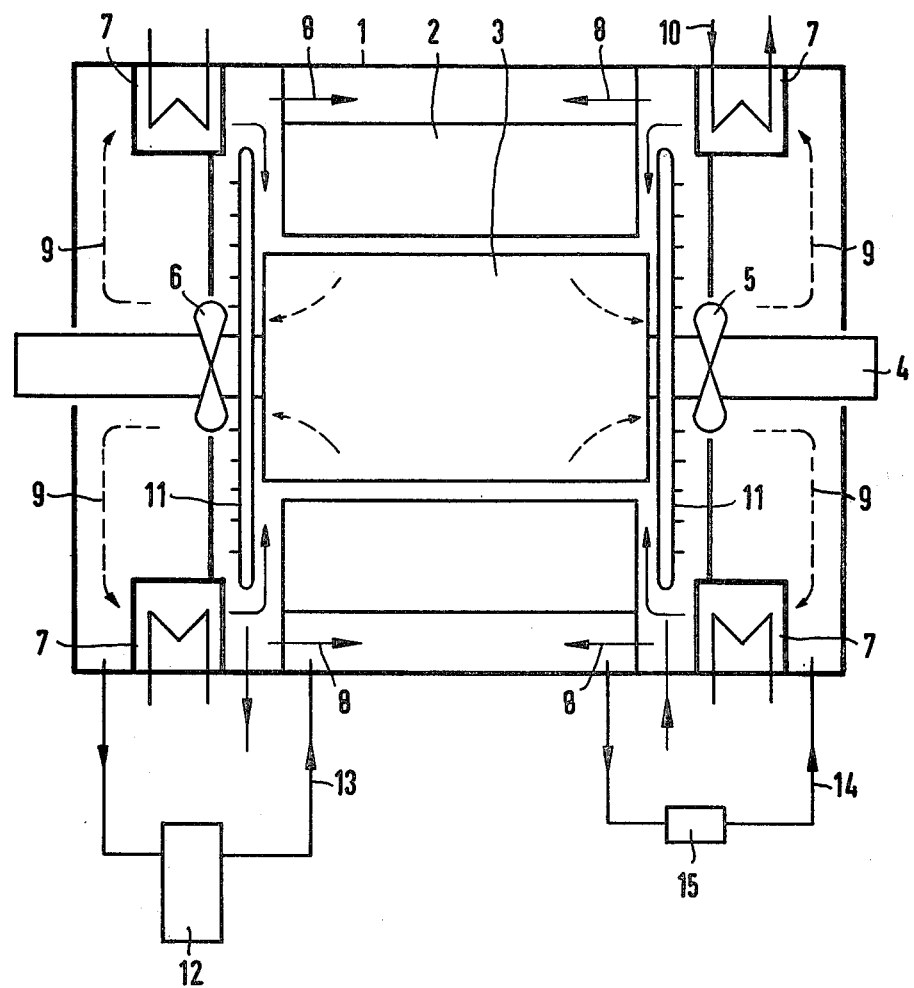

METHOD AND DEVICE FOR MEASURING MOISTURE IN ELECTRIC MACHINES

BACKGROUND OF THE INVENTION

1. Field of the Invention

This invention relates to preventing moisture precipitation at sensitive machine parts and to measuring the moisture to determine leaks within the housing of an electric machine, the winding of which is cooled by water and in which a gas stream, cooled by a heat exchanger, is circulated within the housing.

2. Description of the Prior Art

In electric machines which are water-cooled at least in the stator, a hydrogen cooling gas flow is generally maintained within the hermetically sealed housing for cooling the stack of stator laminations. This cooling gas stream is cooled by coolers which are arranged at the ends of the machine and through which cooling water flows.

However, a certain amount of residual moisture is always contained in the hydrogen gas. The dew point therefor is normally determined by the water entrance temperature of the hydrogen coolers. When a cooler is disconnected in operation, the temperature of the gas can fall below its dew point under unfavorable conditions, and water can precipitate at sensitive parts of the machine. In addition, such changes often result in a residual moisture of variable magnitude, depending on whether it is precipitated at the coolers or on other parts or whether it is present in the gaseous state. A variable moisture impedes a correct moisture measurement within the housing, and determination of leaks in the water-cooled windings by measurement of the moisture content is ineffective and at best uncertain.

SUMMARY OF THE INVENTION

An object of the present invention is to provide a method and a device for preventing cooling gas in the housing of an electric machine from falling-below-the-dew-point with uncontrollable water precipitation and a variable moisture state and providing steady moisture conditions so that a correct moisture measurement can be made to enable detection of leaks.

With the foregoing and other objects in view, there is provided in accordance with the invention a method for preventing moisture precipitation at sensitive machine parts and for measuring moisture to determine leaks of moisture within the housing of an electric machine in which the winding is cooled with water and in which a gas stream cooled by a heat exchanger is circulated within the housing, which includes maintaining a heat sink at a temperature below any machine part within the housing, passing the gas circulating within the housing in contact with the heat sink to bring the gas to the lower temperature of the heat sink and to precipitate moisture from the gas above the dew point of the gas on contact with the heat sink, circulating the gas from the colder heat sink with a dew point at the lower temperature of the heat sink in contact with the sensitive machine parts within the housing at a temperature above the temperature of the heat sink thereby preventing precipitation of moisture from the gas on the sensitive machine parts, continuing recirculating the gas from the heat sink to the machine parts within the housing to create steady moisture conditions in the circulating gas, measuring moisture changes in the circulating gas at a point spaced from the heat sink after the steady moisture conditions have been reached to determine fluctuations in moisture in the gas indicating leakage of moisture into the housing.

In accordance with the invention there is provided a device for preventing moisture precipitation at sensitive machine parts and for measuring moisture to determine leaks of moisture within the housing of an electric machine having a winding cooled with water and a gas stream cooled by a heat exchanger circulated within the housing, including a heat sink maintained at a temperature below any machine part within the housing, connecting means for passing the gas circulating within the housing in contact with the heat sink to bring the gas to the lower temperature of the heat sink and to precipitate moisture from the gas above the dew point of the gas on contact with the heat sink, circulating means for flowing the gas from the colder heat sink with a dew point at the lower temperature of the heat sink in contact with the sensitive machine parts within the housing at a temperature above the temperature of the heat sink thereby preventing precipitation of moisture from the gas on the sensitive machine parts, said circulating means also continuing recirculation from the heat sink to the machine parts within the housing to create steady moisture conditions in the circulating gas, moisture measuring means for measuring moisture changes in the circulating gas at a point spaced from the heat sink after the steady moisture conditions have been reached to determine fluctuations in moisture in the gas indicating leakage of moisture into the housing.

Other features which are considered as characteristic of the invention are set forth in the appended claims.

Although the invention is illustrated and described herein as embodied in a method and device for measuring the moisture in electric machines, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically represents a longitudinal section through a generator along with the block diagrams of the cooling arrangements.

DETAILED DESCRIPTION OF THE INVENTION

In order to generate and maintain a stationary steady moisture condition within the machine housing, the dew point of the cooling gas in the housing is determined or fixed by a separate heat sink which is the coldest point relative to the temperature of the machine parts in the housing. Subsequently, after equilibrium moisture conditions are reached moisture changes are measured to determine changes or fluctuations in moisture thereby alerting the operator to leaks. The heat sink may be an external gas drier with an evaporator arranged parallel to the cooling gas stream. A bypass line for diverting a portion of the gas stream in the housing to the gas drier is advantageously arranged parallel to one of the coolers in the housing for cooling the gas stream. A moisture measuring device is also arranged in a further bypass.

The dew point is therefore determined by the external gas drier, which now constitutes the coldest point in the gas loop. Moisture present and initially still bound is thereby condensed from the gas circulation at this drier and a stationary or steady moisture state is reached within the machine, which is independent of the operating state of the machine. A moisture measurement for the purpose of monitoring the machine makes sense only after this state is reached in order to detect water leaks in the cooling loops within the machine.

As can be seen from the drawing, in the pressure- and gastight housing 1 of the machine are arranged the laminated stator stack 2 with the liquid-cooled stator winding, as well as the rotor 3, which may likewise be liquid-cooled. For supplemental cooling of the laminated stator stack 2 and of other parts of the machine, the housing 1 is filled with hydrogen gas, which is circulated via the fans 5 and 6 mounted on the shaft 4 and is cooled in the coolers 7 which are mounted at the ends of the machine within the housing 1. The cooling gas flow is indicated for the cooled gas by solid arrows 8 and for the warmed-up branch by dashed arrows 9.

In general, the cooling gas has a certain moisture content which is due to moisture residue in the assembly of the machine or to drying-out of the winding or other parts of the installation. The moisture of the cooling gas is here determined usually by the cooling gas temperature. The entrance temperature of the cooling water in the cooling coils 10 of the coolers 7 has its effect in determining the dew point. Another factor determining moisture in the gas is "slippage" of the gas moisture in the coolers 7, i.e. part of the moisture precipitated there is carried along by the gas that flows through. These factors which are not constant cause a variable state of the moisture within the housing, so that a moisture measurement to determine cooling water leaks from the winding would lead to uncertain results.

In addition, the dew point of the gas determined by the cooler can rise if one or several of the coolers 7 are switched off in operation. As a result, other machine parts such as the cooling water ring lines 11 for the stator cooling, through which cold water is likewise admitted, form a colder point in the system, so that moisture precipitates at these parts. This moisture precipitate may then lead to breakdowns.

For these reasons it is important that moisture precipitation at sensitive machine parts be prevented with certainty. It is also important that a stationary or steady state of the moisture within the housing be obtained, so that then a moisture measurement which deviates from the steady state of the moisture may be used for determining water leaks. To accomplish this purpose, a point is provided in the form of a heat sink which constitutes the coldest point of the system for contact with the gas circulating in the loop. This contact of gas with a heat sink colder than any point in the system fixes a defined dew point of the gas, below which the temperature of other machine parts cannot fall under any operating conditions.

A portion of the gas may be diverted from the cooling gas loop in a bypass to a gas drier 12 with an evaporator of conventional design, at which the moisture precipitates and can be discharged from there. The gas drier 12 is advantageously arranged in a bypass line 13 parallel to one of the coolers 7. The gas drier 12 therefore forms the coldest part in the gas loop and therefore also determines the dew point. At the gas drier, the moisture which is at first still present in the hydrogen gas and is bound to the latter, is condensed. This creates within the housing 1 in the gas loop a stationary or steady moisture condition which is independent of whether all gas coolers 7 operate properly or one or several of them are switched off.

When such stationary moisture conditions are reached, moisture changes which occur permit one to draw conclusions about a leak in one of the water-carrying windings. It is therefore advisable to measure the moisture in the gas loop after this stationary state has been reached. To this end, a conventional moisture measuring device 15 can be arranged in a further bypass line 14 to the housing 1, by which moisture fluctuations and absolute magnitudes can be determined.

Thus, the invention solves two problems, namely, first, to prevent moisture precipitation at sensitive machine parts with certainty and secondly, to provide a system for making moisture measurements for determining leaks in the coolant loop. In addition, leaks in the gas coolers themselves can be determined, so that the invention can find application also for purely gas-cooled machines.

There are claimed:

1. Device for preventing moisture precipitation at sensitive machine parts and for measuring moisture to determine leaks of moisture within the housing of an electric machine having a winding cooled with water and a gas stream cooled by a heat exchanger circulated within the housing, comprising a heat sink maintained at a temperature below any machine part within the housing, connecting means for passing the gas circulating within the housing in contact with the heat sink to bring the gas to the lower temperature of the heat sink and to precipitate moisture from the gas above the dew point of the gas on contact with the heat sink, circulating means for flowing the gas from the colder heat sink with a dew point at the lower temperture of the heat sink in contact with the sensitive machine parts within the housing at a temperature above the temperature of the heat sink thereby preventing precipitation of moisture from the gas on the sensitive machine parts, said circulating means also continuing recirculation from the heat sink to the machine parts within the housing to create steady moisture conditions in the circulating gas, moisture measuring means for measuring moisture changes in the circulating gas at a point spaced from the heat sink after the steady moisture conditions have been reached to determine fluctuations in moisture in the gas indicating leakage of moisture into the housing.

2. Device according to claim 1, wherein the heat sink is an external gas drier with an evaporator, connected in a flow arrangement parallel to the cooling gas stream and wherein the moisture measuring means is disposed outside the housing and connected in a flow arrangement parallel to the cooling gas stream.

3. Device according to claim 2, wherein the gas drier and flow arrangement is parallel to one of said heat exchangers.

4. Method for preventing moisture precipitation at sensitive machine parts and for measuring moisture to determine leaks of moisture within the housing of an electric machine in which the winding is cooled with water and in which a gas stream cooled by a heat exchanger is circulated within the housing, which comprises maintaining a heat sink at a temperature below any machine part within said housing, passing the gas circulating within the housing in contact with the heat sink to bring the gas to the lower temperature of the heat sink and to precipitate moisture from the gas above the dew point of the gas on contact with the heat sink, circulating the gas from the colder heat sink with a dew point at the lower temperature of the heat sink in contact with the sensitive machine parts within the housing at a temperature above the temperature of the heat sink thereby preventing precipitation of moisture from the gas on the sensitive machine parts, continuing recirculating the gas from the heat sink to the machine parts within the housing to create steady moisture conditions in the circulating gas, measuring moisture changes in the circulating gas at a point spaced from the heat sink after the steady moisture conditions have been reached to determine fluctuations in moisture in the gas indicating leakage of moisture into the housing.

5. Method according to claim 4, wherein a portion of the circulating gas stream is diverted and passed through the colder heat sink disposed outside the housing and the gas from the colder heat sink returned to the circulating gas stream.

6. Method according to claim 4, wherein a portion of the circulating gas is diverted and passed in contact with a moisture measuring device disposed outside the housing and the gas from the moisture measuring device returned to the circulating gas stream.

7. Method according to claim 5, wherein another portion of the circulating gas is diverted at a point spaced from the point of diversion of the gas stream to the heat sink, and passed in contact with a moisture measuring device disposed outside the housing and the gas from the moisture measuring device returned to the circulating gas stream.

* * * * *